(12) United States Patent
Backes

(10) Patent No.: US 12,197,018 B2
(45) Date of Patent: Jan. 14, 2025

(54) FIBER OPTIC CONNECTOR RETENTION ASSEMBLY

(71) Applicant: PPC BROADBAND, INC., East Syracuse, NY (US)

(72) Inventor: Floyd Backes, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 178 days.

(21) Appl. No.: 17/855,716

(22) Filed: Jun. 30, 2022

(65) Prior Publication Data

US 2023/0003948 A1 Jan. 5, 2023

Related U.S. Application Data

(60) Provisional application No. 63/216,584, filed on Jun. 30, 2021.

(51) Int. Cl.
G02B 6/38 (2006.01)

(52) U.S. Cl.
CPC .......... *G02B 6/3887* (2013.01); *G02B 6/3825* (2013.01); *G02B 6/3869* (2013.01)

(58) Field of Classification Search
CPC ........................................ G02B 6/3887–3889
See application file for complete search history.

(56) References Cited

U.S. PATENT DOCUMENTS

| 5,052,774 A | * | 10/1991 | Bulman | G02B 6/3869 385/86 |
| 5,224,187 A | | 6/1993 | Davisdon | |
| 5,280,552 A | * | 1/1994 | Yokoi | G02B 6/3825 385/69 |
| 5,473,723 A | * | 12/1995 | Stockman | G02B 6/443 385/100 |

(Continued)

FOREIGN PATENT DOCUMENTS

FR 2964754 A1 * 3/2012
JP 11-223752 A * 8/1999

OTHER PUBLICATIONS

International Search Report and Written Opinion mailed Nov. 7, 2022 in corresponding International Application No. PCT/US2022/035874, 13 pages.

*Primary Examiner* — Michael Stahl
(74) *Attorney, Agent, or Firm* — MH2 TECHNOLOGY LAW GROUP LLP

(57) ABSTRACT

A fiber optic cable connector configured to be securely coupled with a cable jacket without crimping includes a connector body including a rear sleeve portion configured to receive a jacket of a fiber optic cable, a ferrule holder configured to be slidingly seated in a forward end of the connector body, a ferrule configured to be seated in the ferrule holder and to terminate an optical fiber, and a retention member having an inner diameter sized to fit into an annular groove in the jacket of the fiber optic cable and an outer diameter sized to extend radially outward of an (Continued)

outer surface of the jacket such that the retention member is configured to engage a surface of the rear sleeve portion of the connector body when the retention member is seated in the annular groove in the jacket so as to increase connection strength between the connector body and the jacket and to resist pull force on the fiber optic cable without crimping the connector body to the jacket.

30 Claims, 8 Drawing Sheets

(56) References Cited

U.S. PATENT DOCUMENTS

| | | | |
|---|---|---|---|
| 7,844,148 B2 * | 11/2010 | Jenkins | G02B 6/443 385/39 |
| 10,656,345 B2 | 5/2020 | Crawford et al. | |
| 2019/0339457 A1 | 11/2019 | Crawford et al. | |
| 2021/0173156 A1 | 6/2021 | Claver et al. | |

* cited by examiner

FIBER OPTIC CONNECTOR RETENTION ASSEMBLY

CROSS REFERENCE TO RELATED APPLICATION

This application claims the benefit of U.S. Provisional Application No. 63/216,584, filed Jun. 30, 2021, the disclosure of which is hereby incorporated by reference herein in its entirety.

TECHNICAL FIELD

The present disclosure relates generally to connectors for terminating fiber optic cable. More particularly, the present disclosure relates to a fiber optic connector retention assembly that secures a fiber optic connector body to a cable jacket.

BACKGROUND

Fiber optical communication systems typically use a network of fiber optic cables to transmit large volumes of data. Typical fiber optic connectors include a ferrule that supports an end portion of an optical fiber. When two fiber optic connectors are interconnected, end faces of the ferrules, on each connector, directly oppose one another. Thus, the optical fibers, which are supported by each ferrule, are also directly opposed to each other. Furthermore, springs in each connector bias the optical fibers towards each other when the connectors are in this interconnected state. An optical signal can then be transmitted from one optical fiber to the other optical fiber.

Conventional fiber optical connectors are either fastened to a Kevlar strengthening member that is included in the fiber optic cable or crimped onto a crimp ring through the use of a crimp tool. Attaching the connector to the Kevlar strengthening member creates a relatively weak connection that is easy to bend. Further, some types of fiber optic cable, such as Miniflex® fiber cable, contains less Kevlar than other standard jumper cord, which could result in a less reliable connection under load.

Crimp-type connectors are not convenient because they require every installer to carry a specialized tool for crimping the connector onto the cable. Also, use of a crimping tool can lead to a poor connection due to potential installer error. Further, such connectors may require double crimping that relies on crushing the cable to retain the connector.

It may be desirable to provide a connector that overcomes one or more of the aforementioned disadvantages of conventional fiber optics connectors. For example, it may be desirable to provide a connector retention assembly that secures a fiber optic connector body to a cable jacket without crimping. It may be desirable to provide a connector retention member that provides increased connection strength between the connector body and the cable jacket. It may be desirable to provide a connector body that is welded to the retention member.

SUMMARY

According to various aspects of the disclosure, a fiber optic cable connector configured to be securely coupled with a cable jacket without crimping includes a metallic connector body including a through bore and a rear sleeve portion configured to receive a jacket of a fiber optic cable, a ferrule holder configured to be slidingly seated in a forward end of the bore of the connector body, a ferrule configured to be seated in the ferrule holder and to terminate an optical fiber passing through the connector body and the ferrule holder, a spring configured to be seated around a stem of the ferrule holder between a rearward-facing annular shoulder of the ferrule holder and a forward-facing annular surface within a cylindrical recess of the connector body, and a fiber optic connector retention member configured to secure the connector body to the jacket of the fiber optic cable. The connector body and the ferrule holder are configured to be coupled together such that the ferrule holder is free to move axially rearward relative to the connector body against a force of the spring when an end face of the ferrule comes into contact with an end face of another optical fiber ferrule when making an optical connection, and the connector body is configured to be coupled with a fiber optic connector housing that is configured to be coupled with a fiber optic port of an adapter or a splitter. The fiber optic connector retention member comprises a metallic split ring having an inner diameter sized to fit into an annular groove in the jacket of the fiber optic cable and an outer diameter sized to extend radially outward of an outer surface of the jacket such that the split ring is configured to engage a surface of the rear sleeve portion of the connector body when the split ring is seated in the annular groove in the jacket so as to increase connection strength between the connector body and the jacket and to resist pull force on the fiber optic cable. The surface of the rear sleeve portion includes a tapered portion configured to permit at least a portion of the split ring to be received in the rear sleeve portion, and the split ring is configured to expand radially outward when slid over non-grooved portions of the fiber optic cable and to retract radially inward to a rest configuration when positioned in the annular groove in the jacket of the fiber optic cable. The split ring and the rear sleeve portion are welded together about a periphery of the engaged surface such that the connector body is configured to be securely coupled with the jacket of the fiber optic cable without crimping the connector body to the jacket.

In some aspects, the housing is an SC connector housing or an LC connector housing.

According to various aspects, the split ring is spot welded to the engaged surface of the rear sleeve portion at spaced apart locations about the periphery of the engaged surface, and the split ring is spot welded to the engaged surface of the rear sleeve portion at locations proximate free ends of the split ring.

According to some aspects, the split ring is spot welded to the engaged surface of the rear sleeve portion about an entirety of the periphery of the engaged surface.

In accordance with various aspects of the disclosure, a fiber optic cable connector configured to be securely coupled with a cable jacket without crimping includes a connector body including a rear sleeve portion configured to receive a jacket of a fiber optic cable, a ferrule holder configured to be slidingly seated in a forward end of the connector body, a ferrule configured to be seated in the ferrule holder and to terminate an optical fiber, and a split ring having an inner diameter sized to fit into an annular groove in the jacket of the fiber optic cable and an outer diameter sized to extend radially outward of an outer surface of the jacket such that the split ring is configured to engage a surface of the rear sleeve portion of the connector body when the split ring is seated in the annular groove in the jacket so as to increase connection strength between the connector body and the jacket and to resist pull force on the fiber optic cable. The split ring and the rear sleeve portion are configured to be welded together about a periphery of the engaged surface such that the connector body is securely coupled with the jacket of the fiber optic cable without crimping the connector body to the jacket.

In some aspects, the body is configured to be coupled with a fiber optic connector housing that is configured to be coupled with a fiber optic port of an adapter or a splitter. According to some aspects, the housing is an SC connector housing or an LC connector housing.

According to various aspects, the surface of the rear sleeve portion includes a tapered portion configured to permit at least a portion of the split ring to be received in the rear sleeve portion.

According to some aspects, the split ring is configured to expand radially outward when slid over non-grooved portions of the fiber optic cable and to retract radially inward to a rest configuration when positioned in the annular groove in the jacket of the fiber optic cable.

In various aspects, the split ring is spot welded to the engaged surface of the rear sleeve portion at spaced apart locations about the periphery of the engaged surface, and the split ring is spot welded to the engaged surface of the rear sleeve portion at locations proximate free ends of the split ring.

In some aspects, the split ring is spot welded to the engaged surface of the rear sleeve portion about an entirety of the periphery of the engaged surface.

According to various aspects, the connector further includes a spring configured to be seated around a stem of the ferrule holder between a rearward-facing annular shoulder of the ferrule holder and a forward-facing annular surface within a cylindrical recess of the connector body. In some aspects, the connector body and the ferrule holder are configured to be coupled together such that the ferrule holder is free to move axially rearward relative to the connector body against a force of the spring when an end face of the ferrule comes into contact with an end face of another optical fiber ferrule when making an optical connection.

In accordance with various aspects of the disclosure, a fiber optic cable connector configured to be securely coupled with a cable jacket without crimping includes a connector body including a rear sleeve portion configured to receive a jacket of a fiber optic cable, a ferrule holder configured to be slidingly seated in a forward end of the connector body, a ferrule configured to be seated in the ferrule holder and to terminate an optical fiber, and a retention member having an inner diameter sized to fit into an annular groove in the jacket of the fiber optic cable and an outer diameter sized to extend radially outward of an outer surface of the jacket such that the retention member is configured to engage a surface of the rear sleeve portion of the connector body when the retention member is seated in the annular groove in the jacket so as to increase connection strength between the connector body and the jacket and to resist pull force on the fiber optic cable without crimping the connector body to the jacket.

In some aspects, the body is configured to be coupled with a fiber optic connector housing that is configured to be coupled with a fiber optic port of an adapter or a splitter. In various aspects, the housing is an SC connector housing or an LC connector housing.

According to some aspects, the surface of the rear sleeve portion includes a tapered portion configured to permit at least a portion of the retention member to be received in the rear sleeve portion.

According to various aspects, the retention member is configured to expand radially outward when slid over non-grooved portions of the fiber optic cable and to retract radially inward to a rest configuration when positioned in the annular groove in the jacket of the fiber optic cable.

In some aspects, the retention member and the rear sleeve portion are configured to be welded together about a periphery of the engaged surface such that the connector body is securely coupled with the jacket of the fiber optic cable without crimping the connector body to the jacket.

In various aspects, the retention member is spot welded to the engaged surface of the rear sleeve portion at spaced apart locations about the periphery of the engaged surface, and the retention member is spot welded to the engaged surface of the rear sleeve portion at locations proximate free ends of the retention member.

According to some aspects, the retention member is spot welded to the engaged surface of the rear sleeve portion about an entirety of the periphery of the engaged surface.

According to various aspects, the connector further includes a spring configured to be seated around a stem of the ferrule holder between a rearward-facing annular shoulder of the ferrule holder and a forward-facing annular surface within a cylindrical recess of the connector body. The connector body and the ferrule holder are configured to be coupled together such that the ferrule holder is free to move axially rearward relative to the connector body against a force of the spring when an end face of the ferrule comes into contact with an end face of another optical fiber ferrule when making an optical connection.

DETAILED DESCRIPTION OF EMBODIMENTS

Figure 1:
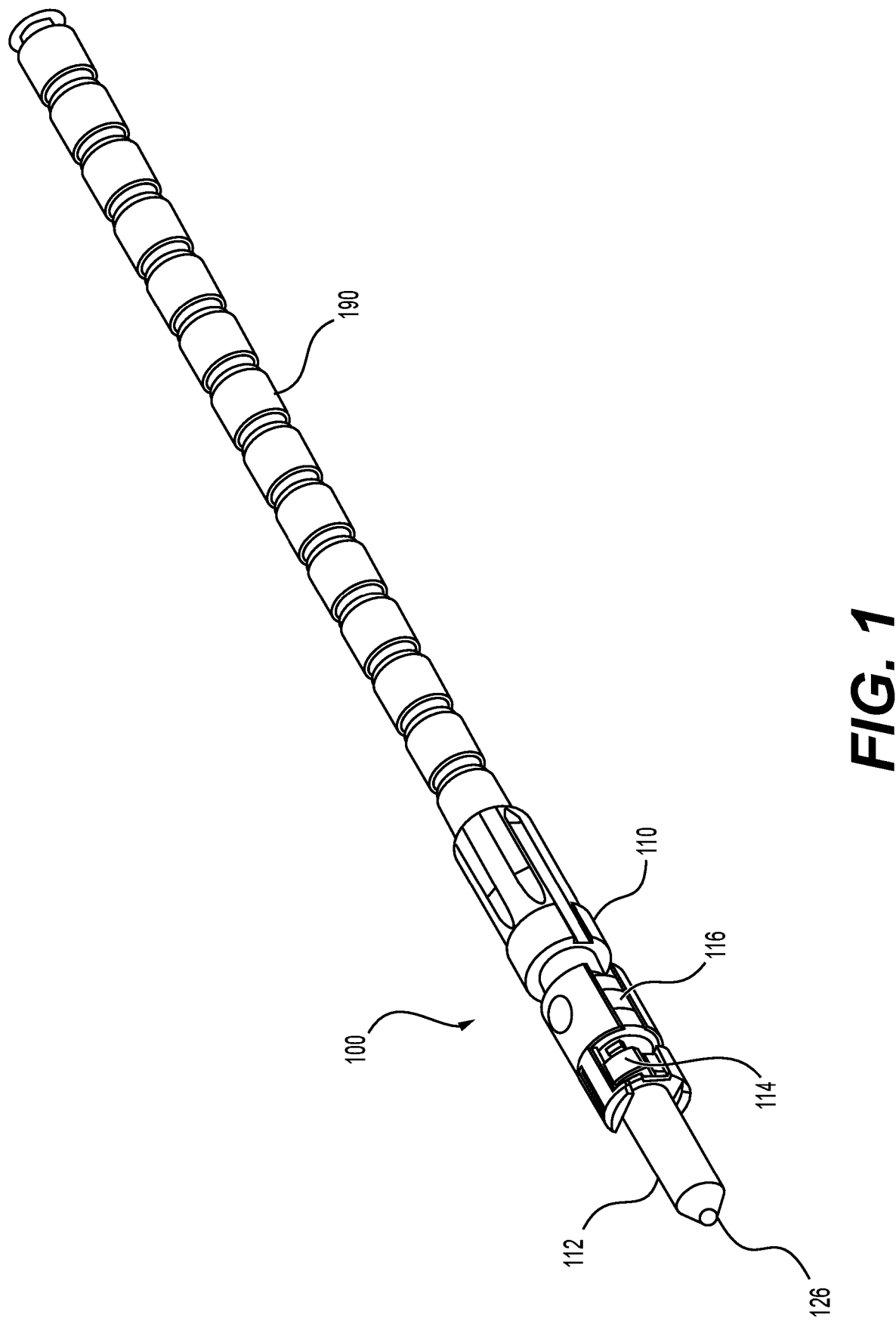
FIG. 1 is a perspective view of a fiber optic cable terminated with an exemplary fiber optic connector in accordance with various aspects of the disclosure.
Figure 2:
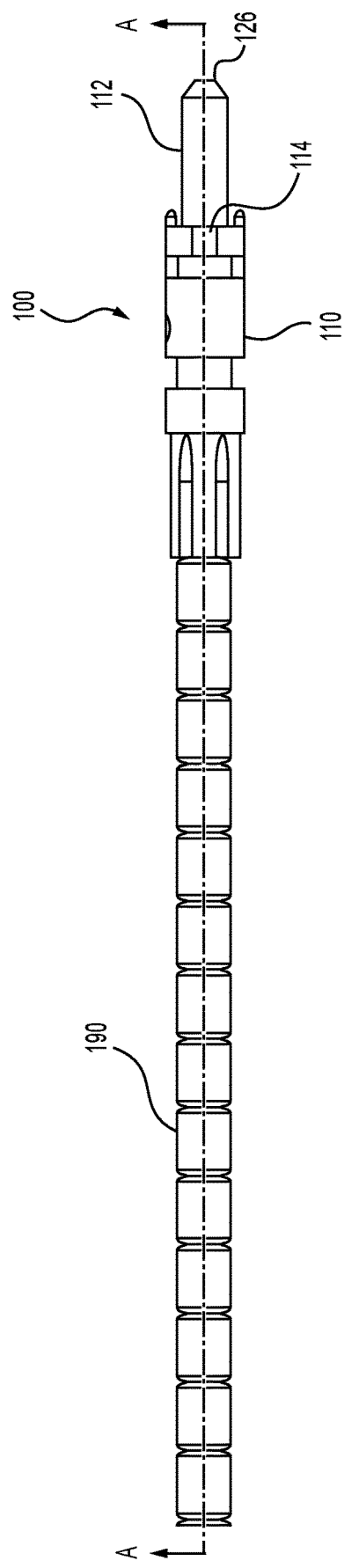
FIG. 2 is a side view of the fiber optic cable terminated with the exemplary fiber optic connector of FIG. 1.
Figure 3:
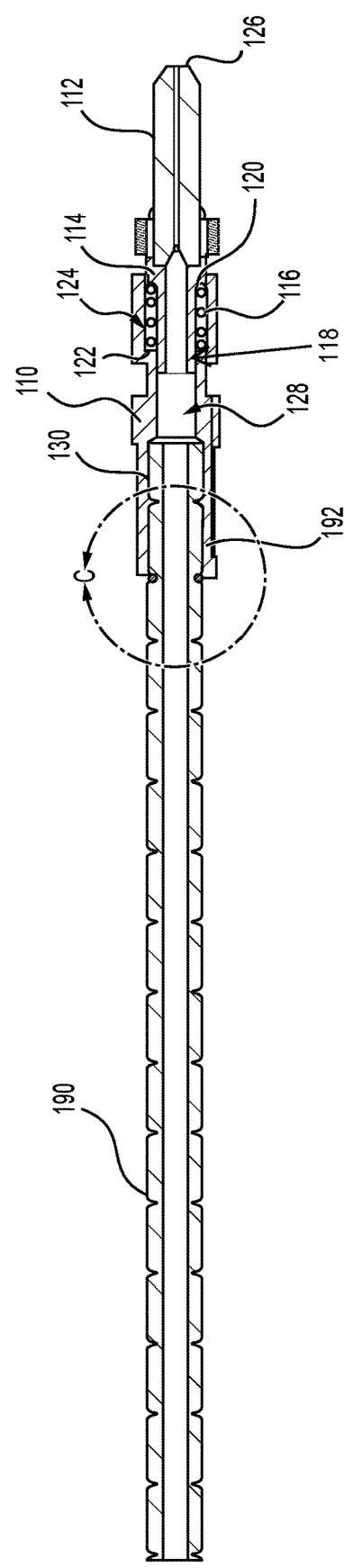
FIG. 3 is a side cross-sectional view of the fiber optic cable terminated with an exemplary fiber optic connector of FIG. 1.

FIGS. 1-4 illustrate an exemplary fiber optic cable 190 terminated with an exemplary fiber optic connector 100 in accordance with various aspects of the disclosure. As illustrated, the fiber optic cable 190 is a fiber optic cable having an annular groove, such as, for example, a Miniflex® fiber cable. Referring to FIGS. 1-3, the connector 100 may include a connector body 110, a ferrule 112, a ferrule holder 114, and a spring 116.

Figure 8:
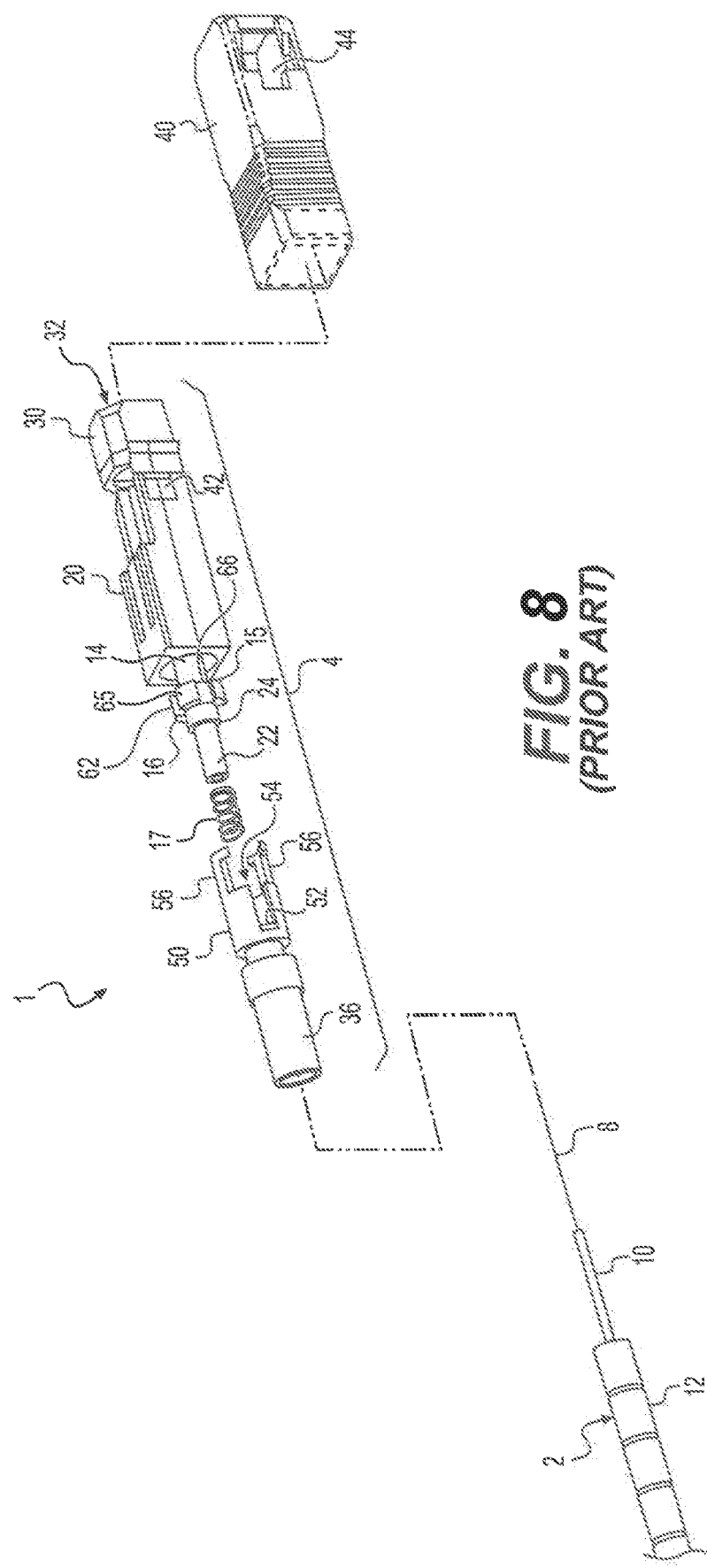
FIG. 8 is an exploded perspective view of an exemplary prior art SC connector.
Figure 9:
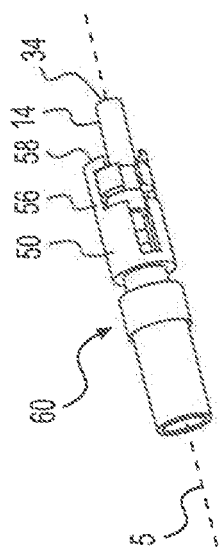
FIG. 9 is a perspective view of the optical fiber connector sub-assembly of FIG. 8 when assembled.
Figure 10:
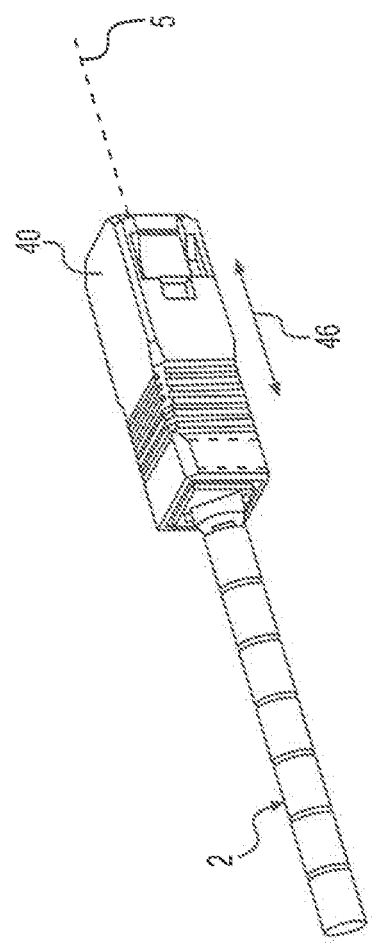
FIG. 10 is a perspective view of the SC connector of FIG. 8 when assembled.

In some aspects, the connector 100 may be a Balistix connector such as a Balistix LC or SC connector, as disclosed in U.S. Pat. Nos. 8,439,577, 10,444,438, and 10,656,345, the disclosures of which are incorporated herein by reference. As illustrated in FIGS. 8-10, an exemplary connector 1, for example, an SC connector, is configured to terminate an optical fiber cable 2, a ferrule housing sub-assembly 4, and an outer housing 40 to provide SC-style push/pull engagement/disengagement with a mating optical fiber socket (not shown).

The cable 2 holds a single strand of 125 µm diameter single mode optical fiber 8, protected by primary and secondary buffering layers 10, about 900 µm in diameter and an outer sheath 12, typically 3 mm to 5 mm in diameter. The optical fiber 8 is terminated by the ferrule in a manner well-known to those skilled in the art and defines a ferrule axis 5 which extends centrally through the SC connector 1.

The ferrule housing sub-assembly 4 includes a cylindrical ceramic ferrule 14, a ferrule holder 16 in which the ferrule is seated, a helical spring 17, a ferrule holder carrier 50, and an inner housing 20. The ferrule holder 16 has a cylindrical stem 22 which extends in an axial direction away from the ferrule 14 towards a sleeve 36 of the ferrule holder carrier 50 used to make a crimp connection around the optical fiber cable sheathing 12. The spring 17 is seated around the stem 22 between an annular shoulder 24 on the ferrule holder 16 and a similar annular surface 52 within a cylindrical recess 54 of the ferrule holder carrier 50. The stem 20 is slidably seated in a closely fitting bore of the ferrule holder carrier 50.

During assembly, the ferrule holder 16 and seated ferrule 14 are inserted axially into the recess 54 of the ferule holder carrier 50. The carrier 50 has a pair of arms 56 around a portion of the stem 22 nearest the ferrule 14 which extend axially forwards of the stem on opposite sides of the base 15 of the ferrule holder. Two pairs of curved fingers 58 are provided, each pair extending in opposite circumferential directions at the end of each arm 56. The fingers 58 extend transversely to the length of the arms 56 partially around the circumference of a portion of the ferrule nearest the base 15.

The ferrule base 15 has four cycles of crenellations 62 spaced symmetrically around the circumference of the base and which provide four corresponding channels that extend parallel to the optical fiber axis 5. These crenellations are in the form of alternating radially high 65 and low 66 cylindrically shaped regions with the circumferential and axial extent of each of the high and low regions being the same. The high and low regions are separated by steps that extend in a radial direction. The arms 56 are seated in opposite radially low regions 66 in a sliding fit with the adjacent high regions 65 and reach axially forward of the base 15 and crenellations 62 so that the fingers 58 engage with the intervening radially high regions 65 on a side 61 of the base 15 opposite the annular surface 24 against which the spring 17 is engaged.

The aforementioned arrangement permits a degree axial movement of the ferrule holder 50, with movement being therefore limited in one direction by the compression of the spring 17 between the two annular surfaces 24, 52 and in the other axial direction by the contact of the fingers 58 with the radially high regions 65 of the crenellations 62 on the base 15 of the ferrule holder 16. As can be seen from the drawings, the ferrule holder base 15 and ferrule holder carrier 50 also have a common cylindrical outer envelope.

The inner housing 20 has a forward portion 30 that coaxially extends around the axially projecting ferrule 14 to define a receptacle 32 for a socket (not shown) to receive a projecting portion of the ferrule 14.

The ferrule holder 16 is free to move backwards inside the ferrule holder carrier 50 and the inner housing 20 when an end face 34 of the ferrule 114 comes into contact with a similar end face (not shown) of another optical fiber ferrule when making an optical connection.

The ferrule holder carrier 50 has a central aperture (not shown) through which the optical fiber 8 and buffering 10 pass and has in a rear-most portion a sleeve 36 sized to receive and be crimped to the cable sheathing 12. In some aspects, a strain-relief sleeve 38, or boot, may be provided around the junction of the optical fiber cable 2 and the ferrule housing sub-assembly 4.

An outer housing 40 is press-fitted axially over the assembled ferrule housing sub-assembly 4. Once the inner housing 20 and outer housing 40 are engaged together, the inner and outer housings are relatively moveable with respect to each other along the ferrule axis 5 between limits defined by an interaction between the inner housing 20 and the outer housing 40 provided by projections 42 on a pair of opposite sides of the inner housing 20 and a pair of apertures 44 in the outer housing. The projections 42 and apertures 44 interact with sprung features inside a matching socket (not shown) to provide SC-style push/pull 46 engagement/disengagement configured to mate with an optical fiber socket.

Referring again to FIGS. 1-3, the connector 100 may be similar to the connector 1 described above. The ferrule 112 may be a cylindrical ceramic ferrule that is seated in the ferrule holder 114. The spring 116 may be a helical spring seated around a stem 118 of the ferrule holder 112 between an annular shoulder 120 on the ferrule holder 114 and a similar annular surface 122 within a cylindrical recess 124 of the connector body 110. The stem 118 is slidably seated in a closely fitting bore of the body 110.

During assembly, the ferrule holder 114 and the seated ferrule 112 are inserted axially into the recess 124 of the body 110. The connector body 110 and the ferrule holder 114 are coupled together such that the ferrule holder 114 is free to move backwards inside the connector body 110 when an end face 126 of the ferrule 112 comes into contact with a similar end face (not shown) of another optical fiber ferrule when making an optical connection.

The connector body 110 has a central aperture 128 through which the optical fiber and buffering (not shown) of the fiber optic cable 190 pass and has in a rear-most portion a sleeve portion 130 sized to receive the jacket 192 of the fiber optic cable 190.

The connector body 110 is configured to be coupled with a housing (not shown) that is configured to be coupled with a fiber optic port of, for example, a bulkhead adapter, a splitter, or the like. The housing may be configured as SC connector, an LC connector, or the like. For example, the housing may be configured as a Belden® SC connector, LC connector, or the like.

Figure 4:
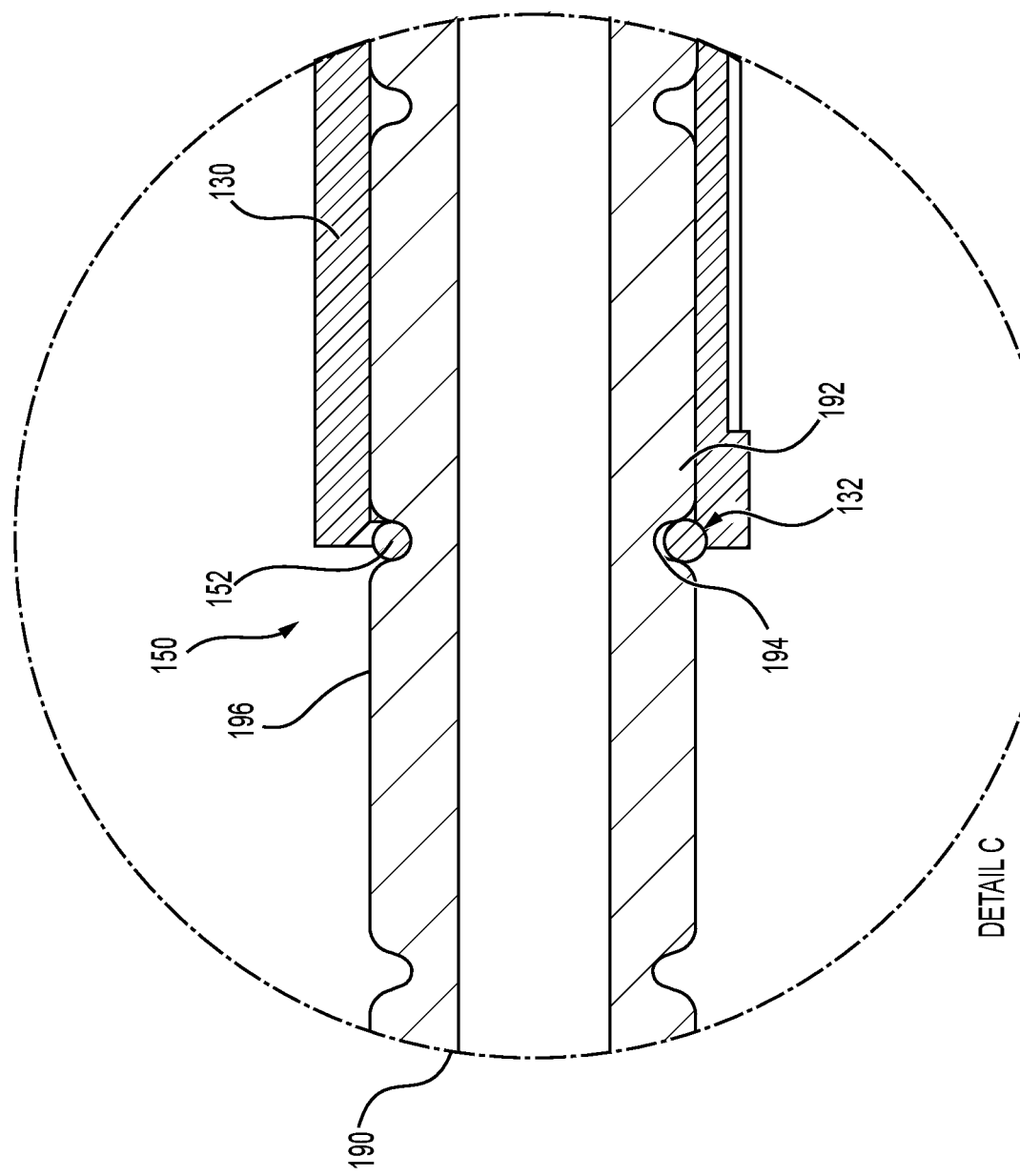
FIG. 4 is an enlarged side cross-sectional view of a portion C of the fiber optic cable terminated with an exemplary fiber optic connector of FIG. 1.
Figure 5:
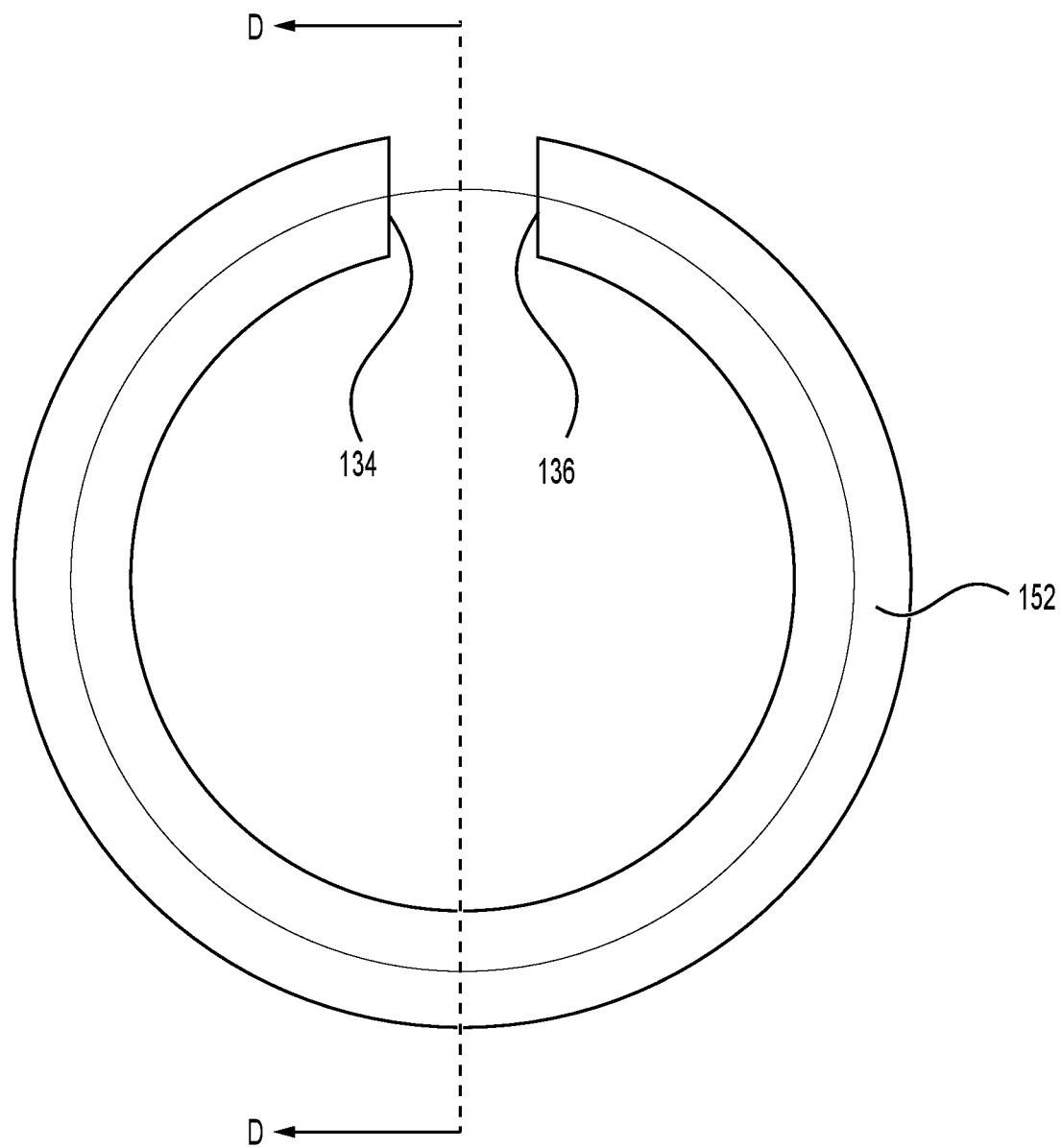
FIG. 5 is a front view of an exemplary split ring of an exemplary fiber optic connection retention assembly in accordance with various aspects of the disclosure.
Figure 6:
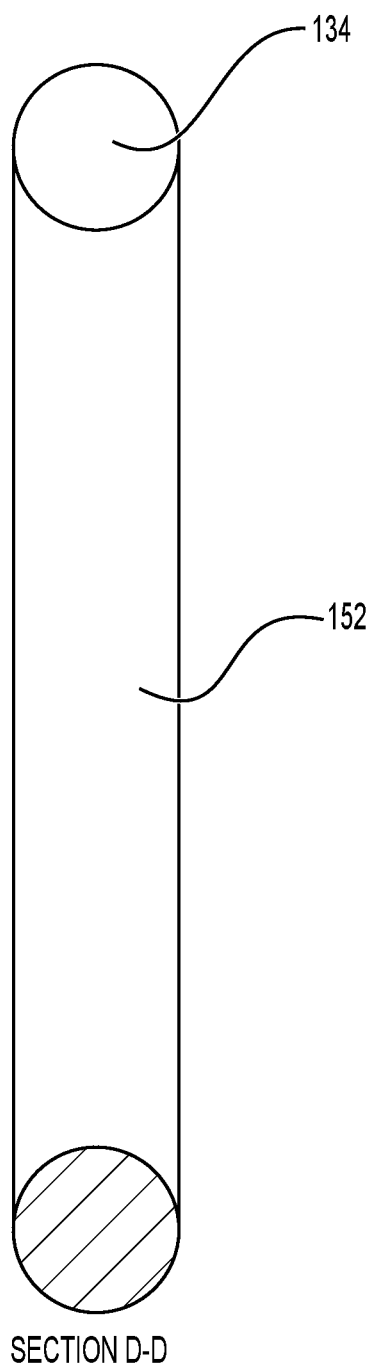
FIG. 6 is a side cross-sectional view of an exemplary split ring of FIG. 5.
Figure 7:
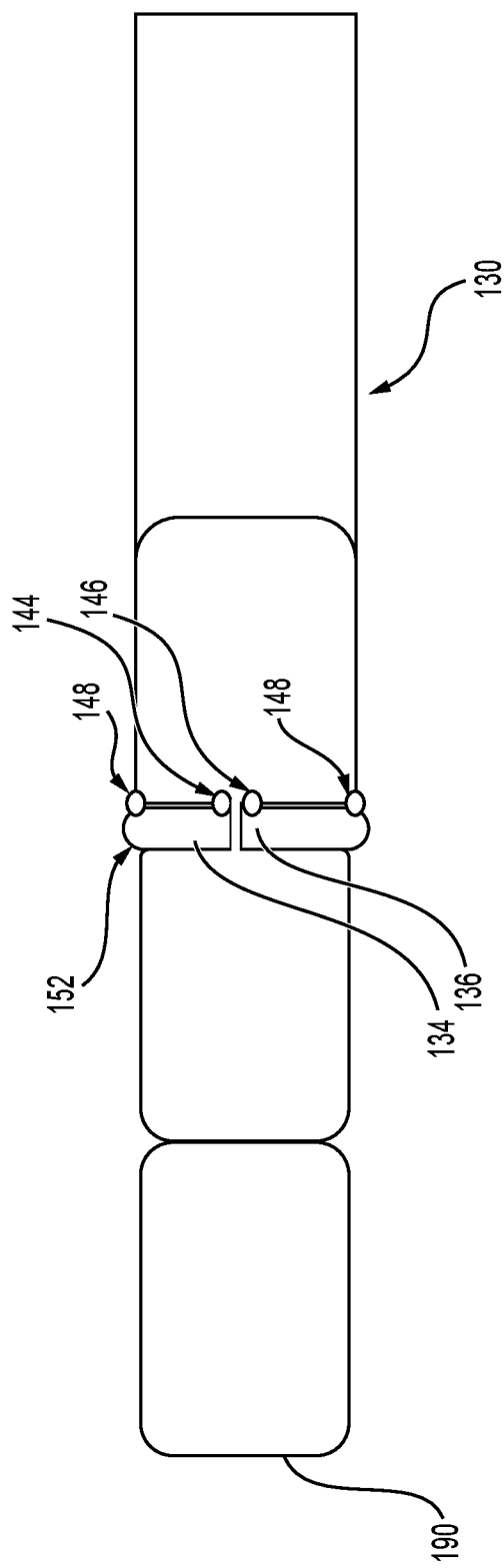
FIG. 7 is a schematic illustration of the exemplary fiber optic connection retention assembly in accordance with various aspects of the disclosure.

As best illustrated in FIGS. 4 and 7, a fiber optic connection device 150 is configured to secure the connector body 110 of the fiber optic connector 100 to the cable jacket 192. The fiber optic connection device 150 includes a retention member 152, for example, a split ring, such as a metallic split ring, optionally a stainless steel split ring, as illustrated in FIGS. 5 and 6. The split ring 152 has an inside diameter sized to fit into an annular groove 194 in the jacket 192 of the fiber optic cable 190 and an outside diameter sized to extend radially outward of an outer surface 196 of the jacket 192 such that the split ring 152 engages an inner surface 132 of the sleeve portion 130 of the connector body 110, for example, a metallic connector body. The inside diameter is configured to fit into the annular groove 194 such that the split ring 152 engages the jacket 192 to increase connection strength between the connector body 110 and the jacket 192 and to resist pull force on the fiber optic cable 190. In some aspects, the inner surface 132 of sleeve portion 130 may be a tapered surface, as shown in FIG. 4, that permits at least a portion of the split ring 152 to be received in the sleeve portion 130.

It should be appreciated that the split ring 152 can be slid over the cable jacket 192 before the connector 100 is assembled on a prepared end of the fiber optic cable 190. The split ring 152 is sufficiently flexible such that the split ring 152 can expand radially outward when slid over the non-grooved portions of the fiber optic cable 190 and then retract radially inward to its rest configuration when positioned in a desired groove 194 in the jacket 192 of the fiber optic cable 190.

After being positioned in the desired groove 194, the split ring 152 and the inner surface 132 of the sleeve portion 130, for example, a metallic sleeve portion, may be welded together around their engaged surfaces. In some aspects, the split ring 152 and the inner surface 132 of the sleeve portion 130 may be spot welded together at locations around the periphery of the engaged surfaces, as shown in FIG. 7. For example, the engaged surfaces may be spot welded at locations 144, 146 proximate the free ends 134, 136 of the split ring 152 and at other locations 148 about the periphery of the engaged surfaces.

It should be appreciated that the weld process may employ a high precision laser welder to allow precisely targeted weld energy to be applied without a large heat affected zone.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A fiber optic cable connector configured to be securely coupled with a cable jacket without crimping, comprising:
   a metallic connector body including a through bore and a rear sleeve portion configured to receive a jacket of a fiber optic cable;
   a ferrule holder configured to be slidingly seated in a forward end of the bore of the connector body;
   a ferrule configured to be seated in the ferrule holder and to terminate an optical fiber passing through the connector body and the ferrule holder;
   a spring configured to be seated around a stem of the ferrule holder between a rearward-facing annular shoulder of the ferrule holder and a forward-facing annular surface within a cylindrical recess of the connector body;
   a fiber optic connector retention member configured to secure the connector body to the jacket of the fiber optic cable;
   wherein the connector body and the ferrule holder are configured to be coupled together such that the ferrule holder is free to move axially rearward relative to the connector body against a force of the spring when an end face of the ferrule comes into contact with an end face of another optical fiber ferrule when making an optical connection;
   wherein the connector body is configured to be coupled with a fiber optic connector housing that is configured to be coupled with a fiber optic port of an adapter or a splitter;
   wherein the fiber optic connector retention member comprises a metallic split ring having an inner diameter sized to fit into an annular groove in the jacket of the fiber optic cable and an outer diameter sized to extend radially outward of an outer surface of the jacket such that the split ring is configured to engage a surface of the rear sleeve portion of the connector body when the split ring is seated in the annular groove in the jacket so as to increase connection strength between the connector body and the jacket and to resist pull force on the fiber optic cable;
   wherein the surface of the rear sleeve portion includes a tapered portion configured to permit at least a portion of the split ring to be received in the rear sleeve portion;
   wherein the split ring is configured to expand radially outward when slid over non-grooved portions of the fiber optic cable and to retract radially inward to a rest configuration when positioned in the annular groove in the jacket of the fiber optic cable; and
   wherein the split ring and the rear sleeve portion are welded together about a periphery of the engaged surface such that the connector body is configured to be securely coupled with the jacket of the fiber optic cable without crimping the connector body to the jacket.

2. The connector of claim 1, wherein the housing is an SC connector housing or an LC connector housing.

3. The connector of claim 1, wherein the split ring is spot welded to the engaged surface of the rear sleeve portion at spaced apart locations about the periphery of the engaged surface; and
   wherein the split ring is spot welded to the engaged surface of the rear sleeve portion at locations proximate free ends of the split ring.

4. The connector of claim 1, wherein the split ring is spot welded to the engaged surface of the rear sleeve portion about an entirety of the periphery of the engaged surface.

5. A fiber optic cable connector configured to be securely coupled with a cable jacket without crimping, comprising:
   a connector body including a rear sleeve portion configured to receive a jacket of a fiber optic cable;
   a ferrule holder configured to be slidingly seated in a forward end of the connector body;
   a ferrule configured to be seated in the ferrule holder and to terminate an optical fiber;
   a split ring having an inner diameter sized to fit into an annular groove in the jacket of the fiber optic cable and an outer diameter sized to extend radially outward of an outer surface of the jacket such that the split ring is configured to engage a surface of the rear sleeve portion of the connector body when the split ring is seated in the annular groove in the jacket so as to increase connection strength between the connector body and the jacket and to resist pull force on the fiber optic cable; and
   wherein the split ring and the rear sleeve portion are configured to be welded together about a periphery of the engaged surface such that the connector body is securely coupled with the jacket of the fiber optic cable without crimping the connector body to the jacket.

6. The connector of claim 5, wherein the body is configured to be coupled with a fiber optic connector housing that is configured to be coupled with a fiber optic port of an adapter or a splitter.

7. The connector of claim 6, wherein the housing is an SC connector housing or an LC connector housing.

8. The connector of claim 5, wherein the surface of the rear sleeve portion includes a tapered portion configured to permit at least a portion of the split ring to be received in the rear sleeve portion.

9. The connector of claim 5, wherein the split ring is configured to expand radially outward when slid over non-grooved portions of the fiber optic cable and to retract radially inward to a rest configuration when positioned in the annular groove in the jacket of the fiber optic cable.

10. The connector of claim 5, wherein the split ring is spot welded to the engaged surface of the rear sleeve portion at spaced apart locations about the periphery of the engaged surface; and
wherein the split ring is spot welded to the engaged surface of the rear sleeve portion at locations proximate free ends of the split ring.

11. The connector of claim 5, wherein the split ring is spot welded to the engaged surface of the rear sleeve portion about an entirety of the periphery of the engaged surface.

12. The connector of claim 5, further comprising a spring configured to be seated around a stem of the ferrule holder between a rearward-facing annular shoulder of the ferrule holder and a forward-facing annular surface within a cylindrical recess of the connector body; and
wherein the connector body and the ferrule holder are configured to be coupled together such that the ferrule holder is free to move axially rearward relative to the connector body against a force of the spring when an end face of the ferrule comes into contact with an end face of another optical fiber ferrule when making an optical connection.

13. A fiber optic cable connector configured to be securely coupled with a cable jacket without crimping, comprising:
a connector body including a rear sleeve portion configured to receive a jacket of a fiber optic cable;
a ferrule holder configured to be slidingly seated in a forward end of the connector body;
a ferrule configured to be seated in the ferrule holder and to terminate an optical fiber; and
a retention member having an inner diameter sized to fit into an annular groove in the jacket of the fiber optic cable and an outer diameter sized to extend radially outward of an outer surface of the jacket such that the retention member is configured to engage a surface of the rear sleeve portion of the connector body when the retention member is seated in the annular groove in the jacket so as to increase connection strength between the connector body and the jacket and to resist pull force on the fiber optic cable without crimping the connector body to the jacket.

14. The connector of claim 13, wherein the body is configured to be coupled with a fiber optic connector housing that is configured to be coupled with a fiber optic port of an adapter or a splitter.

15. The connector of claim 14, wherein the housing is an SC connector housing or an LC connector housing.

16. The connector of claim 13, wherein the surface of the rear sleeve portion includes a tapered portion configured to permit at least a portion of the retention member to be received in the rear sleeve portion.

17. The connector of claim 13, wherein the retention member is configured to expand radially outward when slid over non-grooved portions of the fiber optic cable and to retract radially inward to a rest configuration when positioned in the annular groove in the jacket of the fiber optic cable.

18. The connector of claim 13, wherein the retention member and the rear sleeve portion are configured to be welded together about a periphery of the engaged surface such that the connector body is securely coupled with the jacket of the fiber optic cable without crimping the connector body to the jacket.

19. The connector of claim 18, wherein the retention member is spot welded to the engaged surface of the rear sleeve portion at spaced apart locations about the periphery of the engaged surface; and
wherein the retention member is spot welded to the engaged surface of the rear sleeve portion at locations proximate free ends of the retention member.

20. The connector of claim 18, wherein the retention member is spot welded to the engaged surface of the rear sleeve portion about an entirety of the periphery of the engaged surface.

21. The connector of claim 13, further comprising a spring configured to be seated around a stem of the ferrule holder between a rearward-facing annular shoulder of the ferrule holder and a forward-facing annular surface within a cylindrical recess of the connector body; and
wherein the connector body and the ferrule holder are configured to be coupled together such that the ferrule holder is free to move axially rearward relative to the connector body against a force of the spring when an end face of the ferrule comes into contact with an end face of another optical fiber ferrule when making an optical connection.

22. A connector configured to be securely coupled with a cable jacket without crimping, comprising:
a body portion including a receiving portion configured to receive a jacket of a fiber optic cable;
a holding portion configured to be slidingly seated in a forward end of the body portion;
a ferrule portion configured to be seated in the holing portion and to terminate an optical fiber; and
a retaining portion having an inner diameter sized to fit into an annular groove in the jacket of the fiber optic cable and an outer diameter sized to extend radially outward of an outer surface of the jacket such that the retaining portion is configured to engage a surface of the receiving portion portion of the body portion when the retaining portion is seated in the annular groove in the jacket so as to increase connection strength between the body portion and the jacket and to resist pull force on the fiber optic cable without crimping the body portion to the jacket.

23. The connector of claim 22, wherein the body portion is configured to be coupled with a housing portion that is configured to be coupled with a fiber optic port of an adapter or a splitter.

24. The connector of claim 23, wherein the housing portion is an SC connector housing or an LC connector housing.

25. The connector of claim 22, wherein the surface of the receiving portion includes a tapered portion configured to permit at least a portion of the retaining portion to be received in the receiving portion.

26. The connector of claim 22, wherein the retaining portion is configured to expand radially outward when slid over non-grooved portions of the fiber optic cable and to retract radially inward to a rest configuration when positioned in the annular groove in the jacket of the fiber optic cable.

27. The connector of claim 22, wherein the retaining portion and the receiving portion are configured to be welded together about a periphery of the engaged surface such that the body portion is securely coupled with the jacket of the fiber optic cable without crimping the body portion to the jacket.

28. The connector of claim 27, wherein the retaining portion is spot welded to the engaged surface of the receiving portion at spaced apart locations about the periphery of the engaged surface; and
   wherein the retaining portion is spot welded to the engaged surface of the receiving portion at locations proximate free ends of the retaining portion.

29. The connector of claim 27, wherein the retaining portion is spot welded to the engaged surface of the receiving portion about an entirety of the periphery of the engaged surface.

30. The connector of claim 22, further comprising a biasing portion configured to be seated around a stem portion of the holding portion between a rearward-facing annular shoulder portion of the holding portion and a forward-facing annular surface portion within a cylindrical recess of the body portion; and
   wherein the body portion and the holding portion are configured to be coupled together such that the holding portion is free to move axially rearward relative to the body portion against a force of the biasing portion when an end face of the ferrule comes into contact with an end face of another optical fiber ferrule when making an optical connection.

* * * * *